US010078636B2

United States Patent
Aravkin et al.

(10) Patent No.: US 10,078,636 B2
(45) Date of Patent: Sep. 18, 2018

(54) PROVIDING A HUMAN-SENSE PERCEIVABLE REPRESENTATION OF AN ASPECT OF AN EVENT

(71) Applicant: International Business Machines Corporation, Armonk, NY (US)

(72) Inventors: Aleksandr Y. Aravkin, Bronx, NY (US); Dimitri Kanevsky, Ossining, NY (US); Peter K. Malkin, Ardsley, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 14/335,074

(22) Filed: Jul. 18, 2014

(65) Prior Publication Data

US 2016/0019207 A1    Jan. 21, 2016

(51) Int. Cl.
*G06F 17/30* (2006.01)

(52) U.S. Cl.
CPC .. *G06F 17/30044* (2013.01); *G06F 17/30041* (2013.01)

(58) Field of Classification Search
CPC ............. G06F 17/30041; G06F 17/30044
USPC ........................................ 707/722
See application file for complete search history.

(56) References Cited

U.S. PATENT DOCUMENTS

| 4,754,271 A | 6/1988 | Edwards |
| 5,130,693 A | 7/1992 | Gigandet |
| 5,861,804 A | 1/1999 | Fansa et al. |
| 6,623,326 B2 | 9/2003 | Judkins |
| 7,889,882 B2 | 2/2011 | Marshall |
| 8,286,493 B2 | 10/2012 | Bakish |

(Continued)

FOREIGN PATENT DOCUMENTS

| WO | 0124050 A1 | 4/2001 |
| WO | 03104924 A2 | 12/2003 |
| WO | 2013080739 A1 | 6/2013 |

OTHER PUBLICATIONS

Tarabella et al., "Devices for Interactive Computer Music and Computer Graphics Performances," Multimedia Signal Processing, 1997 IEEE, pp. 65-70.

(Continued)

*Primary Examiner* — Kim T Nguyen
*Assistant Examiner* — Thuy T Bui
(74) *Attorney, Agent, or Firm* — Michael A. Petrocelli

(57) ABSTRACT

A method and system presents a sensory trait to a person for providing a human-sense perceivable representation of an aspect of an event. Information associated with an event can be received which has a first aspect being perceivable by a human via a first human sense at a distance from the event. A second aspect of the event is imperceivable by the human via a second human sense at the distance from the event. A query can be sent to a database for a representation of the first aspect of the event. A response to the query can be received which identifies the representation of the second aspect. The representation of the second aspect can be outputted in a manner that is perceivable by the human via the second human sense, while the human perceives the first aspect via the first human sense at the distance from the event.

20 Claims, 5 Drawing Sheets

(56) References Cited

U.S. PATENT DOCUMENTS

| | | | |
|---|---|---|---|
| 8,913,189 B1* | 12/2014 | Mincher | H04N 5/04 348/207.1 |
| 9,137,308 B1* | 9/2015 | Petrou | H04L 67/12 |
| 2006/0159445 A1* | 7/2006 | Ono | G03B 17/00 396/312 |
| 2006/0234759 A1* | 10/2006 | Kim | H04M 1/72586 455/550.1 |
| 2008/0034081 A1* | 2/2008 | Marshall | G08C 17/02 709/223 |
| 2009/0128306 A1* | 5/2009 | Luden | G06F 3/016 340/407.1 |
| 2011/0255738 A1* | 10/2011 | Gao | G06K 9/228 382/103 |
| 2011/0256886 A1* | 10/2011 | Velusamy | G01S 5/0009 455/456.1 |
| 2012/0045093 A1* | 2/2012 | Salminen | G06K 9/00295 382/103 |
| 2012/0320013 A1* | 12/2012 | Perez | H04N 9/8205 345/207 |
| 2013/0019259 A1 | 1/2013 | Pizzurro et al. | |
| 2013/0066815 A1 | 3/2013 | Oka et al. | |
| 2013/0121660 A1* | 5/2013 | Shinoki | H04N 5/77 386/224 |
| 2013/0195429 A1* | 8/2013 | Fay | H04N 9/87 386/278 |
| 2013/0247082 A1* | 9/2013 | Wang | H04H 60/37 725/14 |
| 2013/0343729 A1* | 12/2013 | Rav-Acha | G11B 27/28 386/285 |
| 2014/0192230 A1* | 7/2014 | Chang | H04N 1/2112 348/231.4 |
| 2014/0249927 A1* | 9/2014 | De Angelo | G06Q 30/0269 705/14.64 |
| 2015/0046953 A1* | 2/2015 | Davidson | G06K 9/00758 725/74 |
| 2015/0147045 A1* | 5/2015 | Birnkrant | G11B 27/031 386/241 |
| 2015/0382138 A1* | 12/2015 | Bose | H04L 51/10 455/456.3 |

OTHER PUBLICATIONS

Anderson et al., "The sound dimension," IEEE Spectrum, vol. 34, Issue: 3, Mar. 1997, pp. 46-50.

Northern Arizona University, "The Remote Sensing Pages," http://jan.ucc.nau.edu/~geog-p/geog/RemoteSensing/index.html, Accessed on May 31, 2013, pp. 1-2.

* cited by examiner

| Images 400 | Audio 401 |
|---|---|
| \<image of bald eagle flying\><br>410 | \<audio recording of bald eagle\><br>420 |
| \<image of bald eagle standing\><br>411 | \<audio recording of bald eagle\><br>421 |
| \<image of rooster\><br>412 | \<audio recording of rooster\><br>422 |
| \<image of sparrow\><br>413 | \<audio recording of sparrow \><br>423 |
| \<image of cow #1\><br>414 | \<audio recording of cow\><br>424 |
| \<image of cow #2\><br>415 | \<audio recording of cow\><br>425 |
| \<image of big dog #1\><br>416 | \<audio recording of big dog\><br>426 |
| \<image of big dog #2\><br>417 | \<audio recording of big dog\><br>427 |
| \<image of little dog #1\><br>418 | \<audio recording of little dog\><br>428 |
| \<image of little dog #2\><br>419 | \<audio recording of little dog\><br>429 |

Fig. 4

PROVIDING A HUMAN-SENSE PERCEIVABLE REPRESENTATION OF AN ASPECT OF AN EVENT

TECHNICAL FIELD

The present disclosure relates to providing, via a computerized device, a human-sense perceivable representation of an aspect of an event.

BACKGROUND

People may observe an event with one of their five senses (including: sight, hearing, smell, taste, and touch), but not be able to perceive the event with another of those senses. For example, a person may observe one or more events visually that occur so far from the location of the event(s), that the person cannot hear sounds that accompany the events. Examples of such visual events could be sea waves on the horizon, trees swaying in a strong wind in the distance, birds that fly high in the sky, and cars on a street viewed from within a skyscraper, etc. Also, when people look at pictures, they may want to hear sounds that are associated with the visual events depicted.

SUMMARY

According to an aspect of the invention, a method provides a human-sense perceivable representation of an aspect of an event. The method includes receiving information associated with an event, the event having a first aspect which is perceivable by a human via a first human sense at a distance from the event. A second aspect of the event is imperceivable by the human via a second human sense at the distance from the event. A query is sent to a database for a representation of the first aspect of the event, and the query identifies the first aspect and the event. A response to the query is received which identifies the representation of the second aspect. The representation of the second aspect is outputted such that the representation of the second aspect is perceivable by the human via the second human sense while the human perceives the first aspect via the first human sense at the distance from the event.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 is an example of database information used for correlating images of animals with the sounds they produce, according to an embodiment of the disclosure.

DETAILED DESCRIPTION

Referring to FIGS. 1-4, a system 10 and method 100, according to an embodiment of the disclosure, for providing, via a computerized device, a representation of an aspect of an event that cannot be perceived by a human via a human sense at a distance from an event, while another aspect of the event is being perceived by the human via another human sense at the distance from the event, is depicted. A computerized device being used by the human can output the representation, so that the representation can be perceived by the human via the human sense while the human is at the distance from the event. For instance, the method can recognize an image of an aspect (i.e., a scene) of the event being seen by the human at a distance from the event, and provide a sound recording that is associated with the image and that represents another aspect (i.e., actual sound) of the event that cannot be heard by the human at the distance from the event. The computerized device can output the sound recording, so that the sound recording can be heard by the human while the human is at the distance from the event.

Stimuli which are perceivable by human senses can be associated with the senses 62 (FIG. 3) of a human or person 60. Human senses can perceive or detect stimuli. For example, a stimulus can be a sound, which is perceived by the person 60 using his or her auditory sense. A person's senses, which can be activated by stimuli of an event in his or her environment, can include: sight (visual perception), hearing (auditory perception), smell (olfactory perception), taste (gustatory perception), and touch (tactile perception).

Figure 1:
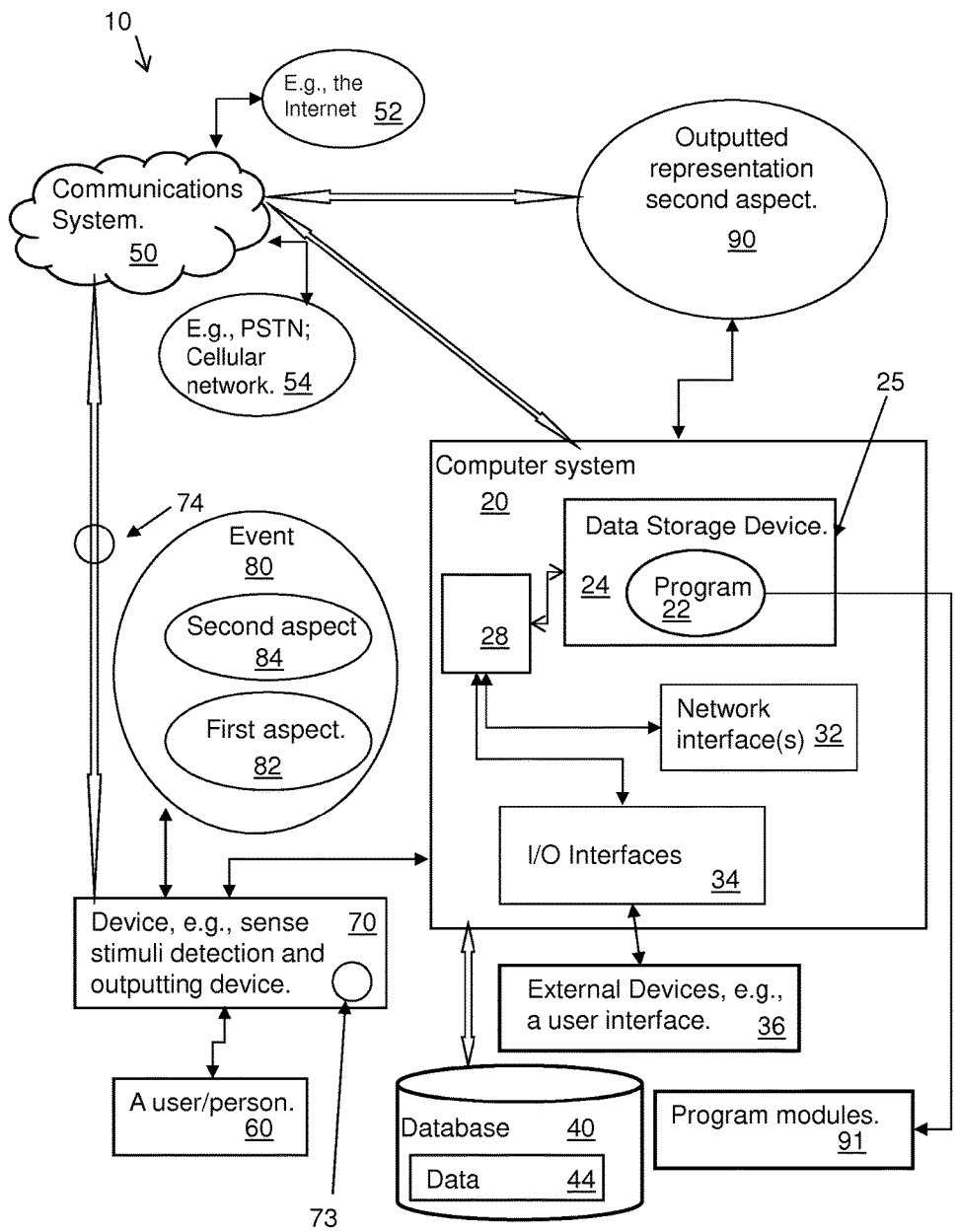
FIG. 1 is a schematic block diagram illustrating an overview of a system and methodology for providing, via a computerized device, a representation of an aspect of an event that cannot be perceived by a human via a human sense at a distance from an event, while another aspect of the event is being perceived by the human via another human sense at the distance from the event, according to an embodiment of the disclosure.
Figure 2:
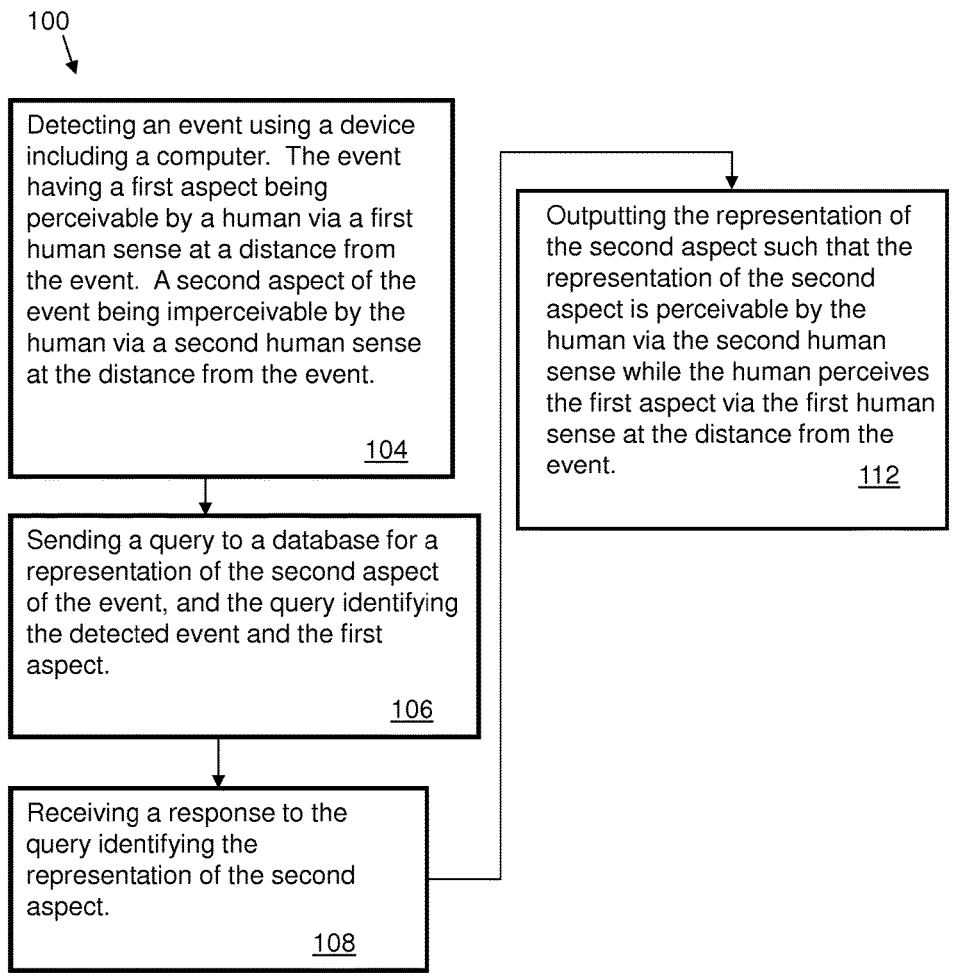
FIG. 2 is a flow chart illustrating a method for providing, via a computerized device, a representation of an aspect of an event that cannot be perceived by a human via a human sense at a distance from an event, while another aspect of the event is being perceived by the human via another human sense at the distance from the event, based on the system shown in FIG. 1, according to an embodiment of the disclosure.

Turning to the flow chart of FIG. 2, the steps of method 100 can be executed by program 22 (FIG. 1). Program 22 (FIG. 1) can be stored on a computer readable storage medium, such as data storage device 24 (FIG. 1), and can be executed by a processor 28 (FIG. 1). Method 100 includes program 22 detecting an event 80 (FIG. 1) using a device 70 (FIG. 1), which includes a computer, as in step 104. The event 80 includes a sensory stimulating event for person 60 (FIG. 1). In other words, event 80 has human sense perceivable aspects including a first aspect 82 (FIG. 1) which is perceivable by a human via a first human sense at a distance from event 80. For example, first aspect 82 (FIG. 1) can be a visually perceived aspect, such as, moving trees in the wind, or a flock of birds gathering in the distance. A second aspect 84 (FIG. 1) of the event, which cannot be perceived by the human 60 (FIG. 1) via a second human sense at the distance from the event 80, can be an auditory stimulating aspect of the event, such as the sound of the birds chirping, singing, or calling. The device 70 can be embodied as a computerized device which is configured to detect event 80 and present a representation of second aspect 90 (as discussed in greater detail below) that is perceivable by the human via the second human sense at the distance from the event. In one instance, the device 70 can be carried by the human/person 60 for mobile use. The detected event using the first aspect may be processed in order to, for example, categorize the first visually perceived aspect of the event. For instance, a photographically captured image of a scene (e.g., event: bird flying) may depict a first aspect (e.g., bird chirping) that represents a bald eagle flying. Image recognition technology may be implemented to determine that the first aspect is related to a "birds flying" category. In alternative implementations, program 22 may incorporate global positioning system (GPS) information in addition to image recognition processes to determine that the first aspect is related to a particular category.

Step 106 of method 100 includes program 22 sending a query 74, via communications system 50 and computer system 20, to a database 40 for a representation of second aspect 90 of the event, whereby query 74 may provide data information corresponding to first aspect 82. For example, upon detection of a first aspect as the "flying birds" category (104), a database query corresponding to the "flying birds" category may be generated. As described in more detail below, FIG. 4 depicts exemplary database information within database 40 that is used to correlate the category of first aspect 82 (e.g., flying bird) with one or more representations of second aspect 90 (e.g., bird chirping, wing flapping sound, etc.). Accordingly, the program 22 can utilize the detected category of the first aspect 82 in a database query to identify one or more corresponding second aspects within database 40. The cataloged events and aspects (referred to as data 44 in FIG. 1) can be stored in database 40 accessible to device 70, so that program 22 can search the cataloged events (i.e., via a database query) in order to find representations of aspects associated with the cataloged events. In one example, program 22 can identify event 80 as a flock of birds, and further identify aspects of event 80 such as the visual aspect of the flock of birds.

Step 108 includes program 22 receiving a response to query 74 identifying the representation of the second aspect 90. The corresponding second aspect 90 to the first aspect 82 can, therefore, be returned as the response to query 74 from database 40 using computer system 20. The determination of the corresponding second aspect can include analyzing other aspects which are associated with the first aspect and the event in the cataloged events. For example, a sound (as an auditory embodiment of a second aspect) can be associated with an event such as a flock of birds gathering in the distance (as a visual embodiment of a first aspect). Additional examples can include, the sound of trees swaying in the breeze (as a second aspect) can be associated with the visual perception of the trees moving or swaying in the distance, or the sound of a dog barking (as a second aspect) can be associated with the visual recognition of a dog barking in the distance. The corresponding aspects of an event can be cataloged in a local database or communicated with on a remote database. The corresponding second aspect 90 (FIG. 3) can include, for example, a sound corresponding to a visual stimulus, or a visual stimulus (e.g., a picture), corresponding to a sound (an auditory stimulus). The second aspects that are retrieved from database 40 via the query may include audio recordings that simulate the second aspects as opposed to being actual sound recordings associated with the first aspect.

Step 112 includes program 22 outputting the representation of the second aspect 90 such that the representation of the second aspect 90 is perceivable by human 60 via the second human sense while human 60 perceives the first aspect via the first human sense at the distance from event 80. For example, the program 22 can output the representation of the second aspect 90 (or second sense stimulus) to human 60 in concert with the first aspect. Program 22 can output the representation of second aspect 90 during the perception of the first aspect by human 60, and can output the representation of second aspect 90 near simultaneously with the perception of the first aspect by human 60 to enhance the perception of event 80 for human 60. Program 22 can produce the representation of second aspect 90 for human 60 to perceive in concert with the first aspect. For example, a sound (i.e., a representation of a second aspect) may be produced in concert with a visual event (i.e., a first aspect). Program 22 producing the representation of second aspect 90 can include, for example, program 22 using a presentation tool or mechanism 71 (FIG. 3) for generating a sound that corresponds to a visual stimulus, or generating a picture that corresponds to a sound. Program 22 can cause the representation of second aspect 90 or a plurality representations of aspects to human 60 as quickly as possible, for example, near simultaneously with the first aspect, to provide the representation of second aspect 90 in concert with first aspect 82.

Thus, device 70 includes program 22 that can detect event 80 and first aspect 82, and present a corresponding representation of second aspect 90 to human 60. Device 70 can be embodied as a mobile device having a computer. Further examples include: a computer, or Personal Data Assistant (PDA), notebook, a tablet, a cell phone, or other mobile device, a laptop, a netbook, or a car communication system. Device 70 can communicate with a communications system 50. Device 70 can be configured to send an electronic message, such as a text or an email, and receive a reply text or email.

One advantage, for example, of the present disclosure is that if a person can't hear an aspect of an event (e.g., birds chirping) while viewing the event (i.e., watching birds gathering), they can hear an outputted representation of that aspect.

Device 70 can be a computer or include a computer. A generic computer or computer system is embodied as a computer system 20 shown in FIG. 1. Method 100 can be provided as a service, for example, wherein an application residing on and executed by device 70 remotely accesses information to provide method 100 as a service. Method 100 may be embodied in program 22 embodied on a computer readable storage medium, e.g., data storage device 24, which is executable by a processor 28 of the computer system 20 (i.e., execute program steps, code, or program code). Program 22 may be stored and run locally on device 70. Program 22 or executable instructions therefrom, may be offered as a service by a provider. The computer system 20 and program 22 shown in FIG. 1 are generic representations of a computer and program that may be local to a user, or provided as a remote service, such as a website accessible using the Internet, and the computer representing one or more remote servers. The computer system 20 also can generically represent herein a computer device, for example, a personal data assistant, a laptop, or desktop computer, etc., or part of one or more servers, alone or as part of a datacenter. The computer system 20 can include a network interface 32, and input/output (I/O) interface(s) 34. The I/O interface 34 allows for input and output of data with an external device 36 that may be connected to computer system 20. The network interface 32 may provide communications between the computer system 20 and a computer network.

Program 22 of device 70 can access a local database, generically represented as database 40 having data 44 for corresponding event 80 and first aspect 82 to second aspect 84, or multiple aspects. Database 40 can be accessed remotely via a communications system 50. The communications system 50 can include the Internet 52, or a public switched telephone network (PSTN), for example, a cellular network 54. The PSTN may include telephone lines, fiber optic cables, microwave transmission links, cellular networks, and communications satellites. Exemplary messaging services may include Short Message Service (SMS) which is a text messaging service component of phone, web, or mobile communication systems, using standardized communications protocols which allow the exchange of short text messages between fixed line or mobile phone devices. The Internet 52 may facilitate numerous communications, such as email, and texting techniques, for example, using a cell phone or laptop computer to send text messages via Multimedia Messaging Service (MMS) (related to SMS) as one technique to send messages that include multimedia content to and from mobile phones, or to and from one or more email accounts via the Internet 52.

In another example, program 22 can initiate steps to detect event 80, for example, taking a picture of event 80 using a cell phone or tablet which includes a camera 73 (FIG. 1). Program 22 sends query 74 to database 40 to determine event 80 (or visual event) in the picture, and program 22 receives a response to query 74 identifying representations of other aspects of the event, such as a representation of a second aspect 90 of the event, for example, a sound for event 80 in the picture.

Figure 2A:
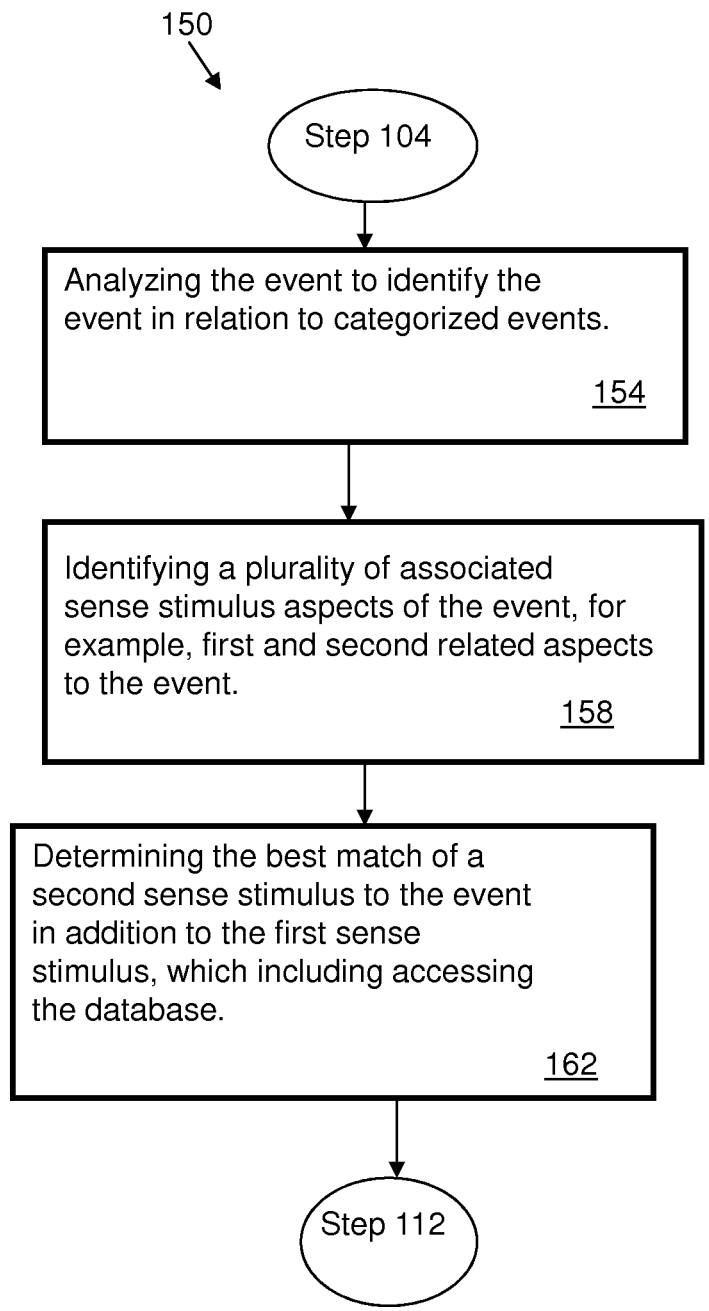
FIG. 2A is a flow chart which continues from the flow chart of FIG. 2, depicting another embodiment according to the disclosure.

Referring to FIG. 2A, a detailed flowchart of a method 150 describes exemplary steps in addition to the steps of the method 100, for identifying event 80 and determining a corresponding representation of second aspect 90 of event 80. The method 150 can be implemented using program 22 accessible by device 70. Beginning from step 104 of method 150, step 154 of method 150 includes program 22 analyzing event 80 to identify event 80 in relation to categorized events. Step 158 includes program 22 identifying a plurality of sense stimuli related to the event 80 which can be represented to a user 60 using device 70. For example, program 22 can identify other sense stimuli than the first aspect 82, which are determined to be corresponding sense stimuli for the event 80. For example, in addition to a single visual aspect (e.g., a flock of birds) of the event 80, multiple other visual aspects (e.g., swaying tree branches, a waterfall, etc.) may also be received and identified by program 22 in response to generated query 74.

Step 162 includes program 22 determining a best match of second aspect 84 to event 80 in addition to first aspect 82. Program 22 can make such a determination by ascertaining which representations of aspects can be outputted by device 70. For example, for the visual perception of an event of waves crashing on a beach, corresponding representations of aspects of the event can include the sound of the waves, the smell of the ocean, or the tactile feel of water. Device 70 may not be able to output the smell and the feel of water. Program 22 can determine that the representation of the aspect can be outputted by device 70, for example, the sound of waves in the above example, as opposed to the smell of the ocean. Thereby, the program 22 analyzes other sense stimuli which are associated with event 80, and determines a best match for a second aspect 84 or sense stimulus in relation to event 80. Method 150 then continues to step 112 of method 100. Program 22 may determine the representation of the aspect that can be outputted by device 70 by analyzing the query 74 received from device 70. According to one exemplary implementation, the query 74 may identify make and model information of device 70. Program 22 may then access preloaded technical data that corresponds to the make and model information within query 74. The preloaded technical data may, for example, include the output capabilities (e.g., speakers, display, etc.) of device 70.

Figure 3:
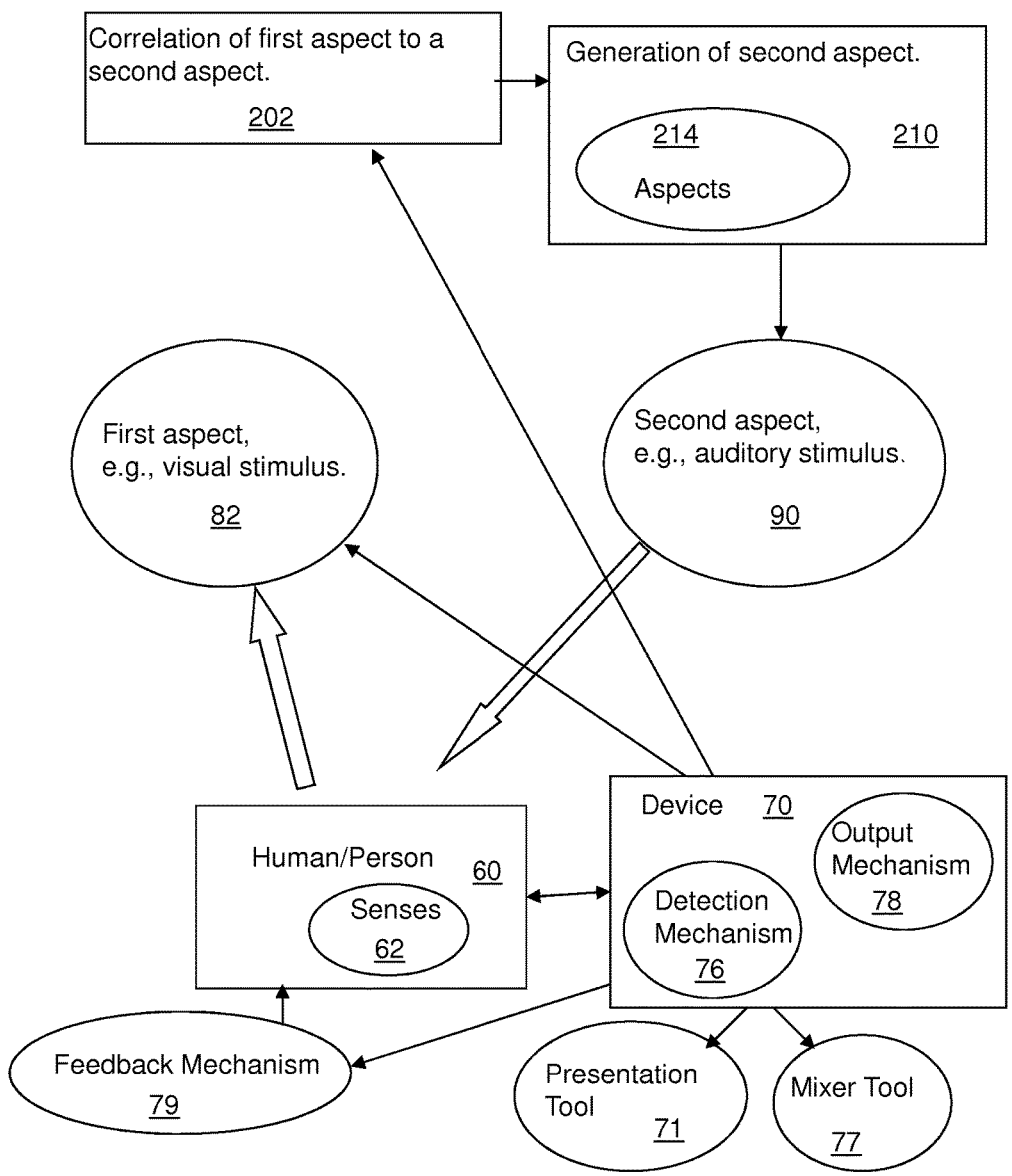
FIG. 3 is a functional block diagram illustrating an embodiment according to the present disclosure based on FIGS. 1 and 2.

Referring to FIG. 3, in one embodiment according to the disclosure, device 70 can include a detection mechanism 76. The detection mechanism 76 detects the event 80 and the first aspect 82. For example, the detection mechanism can be a visual aid, such as binoculars, or an auditory aid such as a microphone. Additionally, device 70 can include an output mechanism 78 (also referred to as a tool). The output mechanism 78 can output a representation of second aspect 90 based on the event 80, for instance, by referencing and correlating aspects with the identified event 214 to event 80 and determining a representation of a second aspect to output so that it can be perceived by a human along with the first aspect. For example, the output mechanism 78 can be a computer which includes a program for generating one or more aspects of event 80 which correspond to event 80. Thus, the computer and program can determine a corresponding second aspect 84 to the first aspect 82 (as shown in Block 202, FIG. 3), and output a representation of the second aspect 90 (Block 210, FIG. 3). A presentation tool 71 can present the representation of the second aspect 90 from the output mechanism 78. The presentation tool 71 can include: a display for presenting a visual aspect, a speaker for transmitting an auditory aspect, or a vibration mechanism for transmitting a tactile aspect (or tactile stimulus for a user).

In another embodiment, a picture scanner can be used to scan a picture. The picture can then be analyzed by program 22 to determine the event 80 (or visual event) in the picture, and determine a corresponding aspect which is most likely to correspond to the event 80, for example, a sound for the event 80 in the picture. Database 40 can be accessed by program 22 to identify the event 80 in the picture, and search for corresponding sense stimuli, that is, aspects related to the event.

Referring to FIG. 3, in another variation according to the disclosure, a feedback mechanism 79 can be part of device 70. Feedback mechanism 79 can receive an indication from a user regarding representation of the second aspect 90, for example, an acceptance of the representation of the second aspect 90. For example, the feedback mechanism 79 can include a dialog box which appears on a display of device 70 for the user to accept or decline the representation of the second aspect 90 as acceptable or unacceptable. If the representation 90 is unacceptable to the user, device 70 searches for a more acceptable corresponding aspects.

In another embodiment according to present disclosure, the device can use a mixer tool 77 to mix a plurality of corresponding aspects to an event, and present the mix to a user for the event. For example, when the first aspect is representative of a visual scene (e.g., flock of birds), a mix of several corresponding generated representations of aspects, such as multiple sound recordings (e.g., birds chirping, rain drops falling, thunder, etc.), may be presented to the user to accompany the visual scene associated with the first aspect.

The method 100 can also be implemented using a computer program product for presenting an aspect to a person via a computerized device in addition to a perceived aspect by the person. The computer program product can include a computer readable storage medium having program code embodied therewith, the program code can be readable/executable by a computer having a processor to perform the method.

An example of information presented in database 40 is depicted in FIG. 4. As shown, one column 400 provides images of animals, while the other column 401 provides corresponding audio recordings. For each given row of the database 40, the given audio recording of the second column 401 is that of the animal depicted in the first column 400. For example, the audio recording (i.e., a recording of a bald eagle) in the first cell 420 of the second column 401 is that of the animal shown in the photo (i.e., a photo of a flying bald eagle) of the first cell 410 of the first column 400. Given an image obtained from the user 60 (FIG. 1) by device 70 (FIG. 1) and received by program 22 (FIG. 1), program 22 determines an image in the first column 400 that best matches the image received from device 70. Given a match, the audio recording from the same row as the matching image is returned by the program for presentation to the user 60. It may be appreciated that, as shown in FIG. 4, the database can provide images of a given animal in different postures. For example, image 410 shows a bald eagle flying, with its wings out, while image 411 shows a bald eagle standing with its wings in. Therefore, the described embodiment would be able to identify an eagle in either posture if its image were received from device 70. Moreover, it may be appreciated that the database 40 may accommodate many different types of a given animal by providing each different type of animal's photo and a corresponding recording of the sound it makes. For example, as further depicted in FIG. 4, the given database 40 can be used to identify eagles (410 and 411), roosters 412, sparrows 413, cows 414-415 (e.g., different types of cows), big dogs 416-417, and small dogs 418-419 dogs. Each of these images 410-419 include an associated respective database audio recording entry 420-429. It may be appreciated that database 40 could also provide images and associated audio recording entries for other objects, including, but not limited to: waves at the beach, where the audio recording would be that of a wave crashing on a beach; a musical instrument, where the associated audio recording would be of a guitar being plucked or strummed; and a running motorcycle, where the audio would be that of a running motor cycle. Finally, it may be appreciated that beyond providing an image of an overall scene, an image including two or more objects may be provided. Accordingly, a user 60 could specify a particular region of interest in the overall image. For example, given a photograph of a pasture in a farm, the user 60 could select just the area which includes a cow. In one embodiment, this could be accomplished simply by the user cropping the image to include only the area of interest (i.e., the cow). By providing an image containing solely the image of interest, the user would ensure that the matching of the provided image to one in the database 40 would be accurate. The table of FIG. 4 may, in some implementation, include a sub-table corresponding to a detected event category. For example, once the database query identifies the event category as a detected event associated with a bird flying (first aspect), one or more audio recordings (second aspect(s)) associated with detected event category is accessed. Although the exemplary embodiment of FIG. 4 depicts an image of a bald eagle flying 410 as a table entry, the table entry at 410 may alternatively include an event category (e.g., flying birds) instead of an image. Thus, the event category (e.g., flying birds) may then be mapped to a corresponding one or more second aspects.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Referring to at least FIG. 1, the present invention may be a system, a method, and/or a computer program product 25. The computer program product may include a computer readable storage device 24 (or media) having computer readable program instructions 22 thereon for causing a processor 28 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present disclosure has been particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

What is claimed is:

1. A method for providing a human-sense perceivable representation of an aspect of an event, the method comprising:

receiving, on a device, information associated with an event perceived by a human, the event having a first aspect being perceivable by the human via a first human sense at a distance from the event, and a second aspect of the event being imperceivable by the human via a second human sense at the distance from the event, the event cannot be perceived by the human via a second human sense at the distance from the event, thereby the first aspect being captured at the event and the second aspect not being captured at the event, the first and second aspects correspond to different stimuli provided by the event which has human sense perceivable aspects, a first stimulus and a second stimulus each being associated with the first and second human senses, respectively, and the second stimulus not being perceived by the human at the event, wherein the first aspect is visual, and the second aspect is auditory;

sending a query to a database for a representation of the second aspect of the event which was not captured at the event, the query identifying the event and the first aspect;

receiving, at the device, a response to the query identifying the representation of the second aspect of the event which was not captured at the event, based on the identification of the event and the first aspect which was captured at the event; and outputting the representation of the second aspect on the device, such that the representation of the second aspect is perceivable by the human via the second human sense while the human perceives the first aspect via the first human sense at the distance from the event, and the representation of the second aspect represents one of the human sense perceivable aspects associated with the event corresponding to a stimulus provided by the event.

2. The method of claim 1, further comprising detecting the received event having the first aspect using image processing.

3. The method of claim 1, further comprising detecting the received event having the first aspect using image processing and global positioning system (GPS) information.

4. The method of claim 1, wherein the outputting comprises transmitting the representation of the second aspect to the human over a communications network.

5. The method of claim 1, further comprising:
providing one or more tools for the outputting of the second aspect, wherein the provided tools include an electronic display, an audio speaker, or a vibration mechanism.

6. The method of claim 1, further comprising:
presenting a plurality of representations of aspects of the event for selection by the human to be perceived while the human perceives the first aspect of the event.

7. The method of claim 1, further comprising:
receiving feedback about the representation of the second aspect from the human.

8. The method of claim 7, wherein the feedback is an acceptance or rejection of the representation of the second aspect.

9. The method of claim 7, further comprising: responsive to a rejection of the representation of the second aspect, presenting another representation of the aspect of the event for selection by the human to be perceived while the human perceives the first aspect of the event.

10. The method of claim 1,
determining a category for events and aspects of the events;
cataloging events and aspects of respective events in the database; and
corresponding the second aspect to the first aspect using the cataloged events and aspects.

11. The method of claim 1, wherein the event is a physical event, the physical event being imperceivable regarding the second aspect from the distance from the event.

12. The method of claim 1, further comprising:
detecting the received event having the first aspect and the second aspect using image processing and global positioning system (GPS) information;
corresponding the second aspect to the first aspect using cataloged events and aspects; and
determining that the first aspect is related to a particular category of events in the cataloged events using the global positioning system information in addition to the image processing.

13. A computer program product for presenting a sensory trait to a person via a computerized device in addition to a perceived sensory trait by the person, the computer program product comprising a computer readable storage medium having program code embodied therewith, the program code being readable/executable by a processor to perform a method, comprising:
receiving, on a device, information associated with an event perceived by a human, the event having a first aspect being perceivable by the human via a first human sense at a distance from the event, and a second aspect of the event being imperceivable by the human via a second human sense at the distance from the event, the event cannot be perceived by the human via a second human sense at the distance from the event, thereby the first aspect being captured at the event and the second aspect not being captured at the event, the first and second aspects correspond to different stimuli provided by the event which has human sense perceivable aspects, a first stimulus and a second stimulus each being associated with the first and second human senses, respectively, and the second stimulus not being perceived by the human at the event, wherein the first aspect is visual, and the second aspect is auditory;
sending a query to a database for a representation of the second aspect of the event which was not captured at the event, the query identifying the first aspect and the detected event;
receiving, at the device, a response to the query identifying the representation of the second aspect of the event which was not captured at the event, based on the identification of the event and the first aspect which was captured at the event; and
outputting the representation of the second aspect on the device, such that the representation of the second aspect is perceivable by the human via the second human sense while the human perceives the first aspect via the first human sense at the distance from the event, and the representation of the second aspect represents one of the human sense perceivable aspects associated with the event corresponding to a stimulus provided by the event.

14. The computer program product of claim 13, further comprising:
presenting a plurality of representations of aspects of the event for selection by the human to be perceived while the human perceives the first aspect of the event.

15. The computer program product of claim 13, further comprising:
receiving feedback about the representation of the second aspect from the human.

16. The computer program product of claim 15, wherein the feedback is an acceptance or rejection of the representation of the second aspect.

17. A system for providing a human-sense perceivable representation of an aspect of an event, the system comprising a computer readable storage medium, a processor, and program instructions stored on the computer readable storage medium for execution by the processor, the program instructions comprising:
program instruction to receive, on a device, information associated with an event perceived by a human, the event having a first aspect being perceivable by the human via a first human sense at a distance from the event, and a second aspect of the event being imperceivable by the human via a second human sense at the distance from the event, the event cannot be perceived by the human via a second human sense at the distance from the event, thereby the first aspect being captured at the event and the second aspect not being captured at the event, the first and second aspects correspond to different stimuli provided by the event which has human sense perceivable aspects, a first stimulus and a second stimulus each being associated with the first and second human senses, respectively, and the second stimulus not being perceived by the human at the event, wherein the first aspect is visual, and the second aspect is auditory;
program instruction to send a query to a database for a representation of second aspect of the event which was not captured at the event, the query identifying the first aspect and the detected event;

program instructions to receive a response, at the device, to the query identifying the representation of the second aspect of the event which was not captured at the event, based on the identification of the event and the first aspect which was captured at the event; and program instruction to output the representation of the second aspect on the device, such that the representation of the second aspect is perceivable by the human via the second human sense while the human perceives the first aspect via the first human sense at the distance from the event, and the representation of the second aspect represents one of the human sense perceivable aspects associated with the event corresponding to a stimulus provided by the event.

18. The system of claim 17, wherein the first and second aspects are synchronized when outputted.

19. The system of claim 17, further comprising:
a device for the outputting the representation of the second aspect.

20. The system of claim 17, further comprising:
a device having one or more tools for the outputting of the representation of the second aspect, the tools including: a display, a speaker, or a vibration mechanism.

* * * * *